US012266288B1

(12) United States Patent
Wu

(10) Patent No.: US 12,266,288 B1
(45) Date of Patent: Apr. 1, 2025

(54) LUMINANCE CONTROL CIRCUIT AND LUMINANCE CONTROL METHOD

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/621,000

(22) Filed: Mar. 28, 2024

(51) Int. Cl.
*G09G 3/20* (2006.01)

(52) U.S. Cl.
CPC ... *G09G 3/2007* (2013.01); *G09G 2320/0626* (2013.01); *G09G 2320/0666* (2013.01); *G09G 2330/021* (2013.01); *G09G 2360/16* (2013.01)

(58) Field of Classification Search
None
See application file for complete search history.

(56) References Cited

U.S. PATENT DOCUMENTS 8,059,082 B2 * 11/2011 Raman .................. G09G 3/342 345/102
8,896,641 B2 * 11/2014 Kim .................. G09G 3/3233 345/694
10,089,959 B2 * 10/2018 Jangda .................. G09G 3/3208
10,504,456 B2 * 12/2019 Inokawa .................. G09G 3/3225
11,120,769 B2 * 9/2021 Deng .................. G09G 5/10
11,200,867 B1 * 12/2021 Yang .................. G09G 3/3696
11,809,195 B2 * 11/2023 Wang .................. G06V 10/141
2006/0007240 A1 * 1/2006 Herbert .................. G06F 3/1446 345/591
2007/0216616 A1 * 9/2007 Stessen .................. G09G 3/3413 345/84
2008/0252791 A1 * 10/2008 Mitsunaga .................. H04N 23/86 348/673
2008/0297467 A1 * 12/2008 Hsu .................. G09G 3/3406 382/168
2009/0091528 A1 * 4/2009 Hong .................. G09G 3/3406 345/102
2013/0076803 A1 * 3/2013 Lee .................. G09G 3/3233 345/82
2015/0062186 A1 * 3/2015 Park .................. G09G 3/3233 345/87
2015/0062187 A1 * 3/2015 Park .................. G09G 3/3413 345/63
2015/0170560 A1 * 6/2015 Lim .................. G09G 3/3291 345/691
2018/0182308 A1 * 6/2018 Chen .................. G09G 3/2081
(Continued)

*Primary Examiner* — Fred Tzeng
(74) *Attorney, Agent, or Firm* — JCIPRNET

(57) ABSTRACT

A luminance control circuit and a luminance control method are provided. The luminance control circuit includes a first converter, average pixel level (APL) calculator, a luminance adjusting circuit and a second converter. The first converter converts a gray level result of an image data into at least one luminance. The APL calculator generates an APL value according to the at least one luminance. The luminance adjusting circuit generates at least one adjusting value according to the APL value and adjust the at least one luminance to be at least one adjusted luminance using the least one adjusting value. The second converter converts the at least one adjusted luminance into an adjusted gray level result of the image data. The adjusted gray level result is negative correlated with the APL value.

20 Claims, 10 Drawing Sheets

(56) References Cited

U.S. PATENT DOCUMENTS

| | | | | |
|---|---|---|---|---|
| 2020/0193904 A1* | 6/2020 | Kho | ..................... | G09G 3/3233 |
| 2020/0302861 A1* | 9/2020 | Pyo | ..................... | G09G 3/3208 |
| 2021/0174738 A1* | 6/2021 | Pyo | ..................... | G09G 3/3208 |
| 2022/0084463 A1* | 3/2022 | Pyo | ..................... | G09G 3/3225 |

* cited by examiner

LUMINANCE CONTROL CIRCUIT AND LUMINANCE CONTROL METHOD

BACKGROUND

Technical Field

The disclosure generally relates to a control circuit and a control method, and more particularly to a luminance control circuit and a luminance control method for a display device.

Description of Related Art

Generally, a display device may display an image according to a gray level of image data. The display device displays a high luminance image according to the image data having high gray level. However, the display device has higher power consumption when displaying the high luminance image. Thus, how to decrease the power consumption when displaying the high luminance image is one of the research and development focuses of those skilled in the art.

SUMMARY

The disclosure provides a luminance control circuit and a luminance control method. The luminance control circuit and the luminance control method can decrease a power consumption of a display device when displaying the high luminance image.

The luminance control circuit in an embodiment of the disclosure includes a first converter, an average pixel level (APL) calculator, a luminance adjusting circuit and a second converter. The first converter converts a gray level result of an image data into at least one luminance of the image data. The APL calculator is coupled to the first converter. The APL calculator generates an APL value according to the at least one luminance. The luminance adjusting circuit is coupled to the APL calculator and the first converter. The luminance adjusting circuit generates at least one adjusting value according to the APL value and adjust the at least one luminance to be at least one adjusted luminance using the least one adjusting value. The second converter is coupled to the first converter. The second converter converts the at least one adjusted luminance into an adjusted gray level result of the image data. The adjusted gray level result is negative correlated with the APL value.

The luminance control method in an embodiment of the disclosure includes: converting a gray level result of an image data into at least one luminance; generating an average pixel level (APL) value according to the at least one luminance; generating at least one adjusting value according to the APL value and adjusting the at least one luminance to be at least one adjusted luminance using the least one adjusting value; and converting the at least one adjusted luminance into an adjusted gray level result of the image data. The adjusted gray level result is negative correlated with the APL value.

Based on the above, the adjusted gray level result is negative correlated with the APL value. The adjusted gray level result would be decreased as the APL value increases. Therefore, when the display device displays the high luminance image corresponding a high APL value, the adjusted gray level result would be decreased. In this way, the power consumption of the display device is decreased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being “coupled to”, “connected to”, or “conducted to”

another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
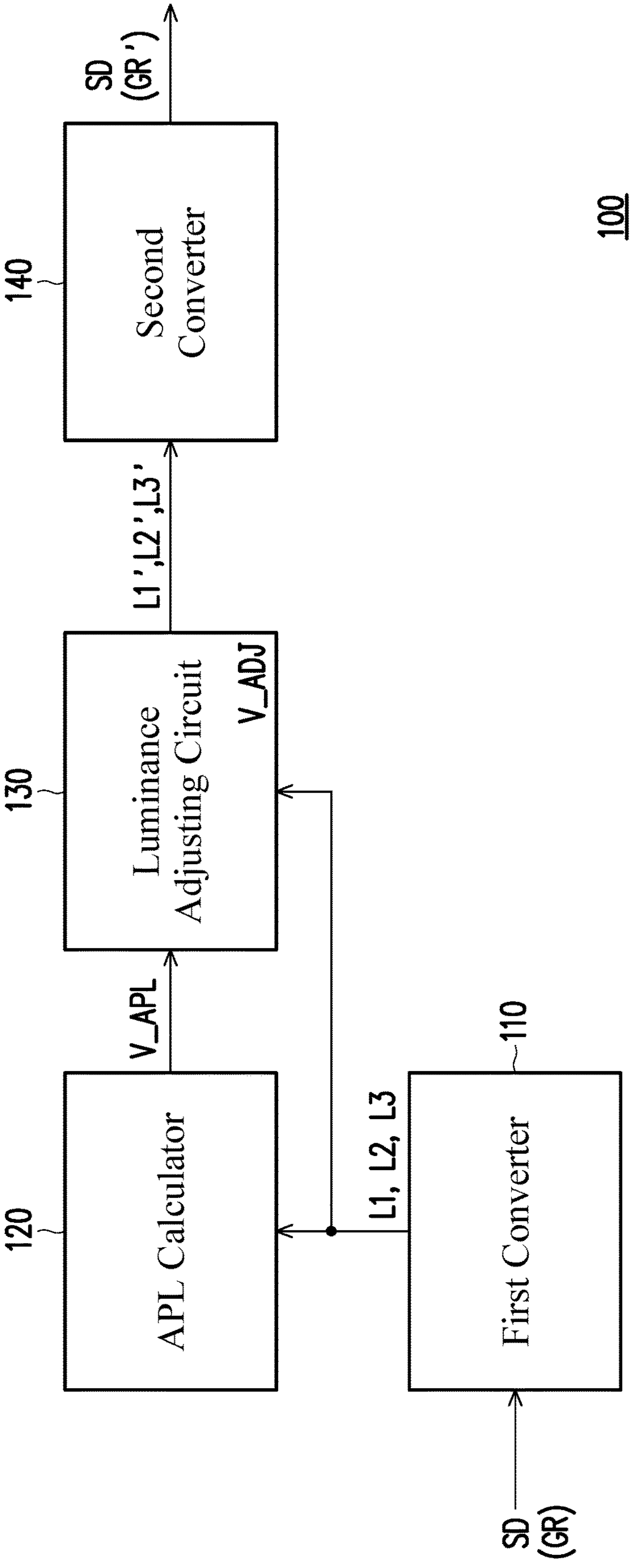
FIG. 1 illustrates a schematic diagram of a luminance control circuit according to an embodiment of the disclosure.

Please refer to FIG. 1, FIG. 1 illustrates a schematic diagram of a luminance control circuit according to an embodiment of the disclosure. The luminance control circuit 100 is used to control a luminance of a display device (not shown). In the embodiment, the luminance control circuit 100 includes a first converter 110, an average pixel level (APL) calculator 120, a luminance adjusting circuit 130 and a second converter 140. The first converter 110 receives an image data SD. The first converter 110 converts a gray level result GR of the image data SD into luminance L1 to L3. For example, the gray level result GR includes at least one gray level of displaying pixels corresponding to a displaying area. The first converter 110 is a gray-level to luminance converting circuit.

For example, the luminance L1 is a red luminance of the image data SD. The luminance L2 is a green luminance of the image data SD. The luminance L3 is a blue luminance of the image data SD, but the disclosure is not limited thereto. In some embodiments, the first converter 110 converts a gray level result GR of the image data SD into luminance L1 of the image data SD. The luminance L1 is a white luminance of the image data SD, but the disclosure is not limited thereto.

For example, each of the luminance L1 to L3 is a luminance of different sub area in the displaying area, but the disclosure is not limited thereto.

In the embodiment, the APL calculator 120 is coupled to the first converter 110. The APL calculator 120 generates an APL value V_APL according to the luminance L1 to L3.

The luminance adjusting circuit 130 is coupled to the APL calculator 120 and the first converter 110. The luminance adjusting circuit 130 generates adjusting value V_ADJ according to the APL value V_APL and adjusts the at least one luminance L1 to L3 to be adjusted luminance L1' to L3' using the adjusting value V_ADJ. The second converter 140 is coupled to the first converter 130. The second converter 140 converts the adjusted luminance L1' to L3' into an adjusted gray level result GR'. In the embodiment, the adjusted gray level result GR' is negative correlated with the APL value V_APL. The second converter 140 is a luminance to gray-level converting circuit.

It should be noted, the adjusted gray level result GR' is negative correlated with the APL value V_APL. The adjusted gray level result GR' would be decreased as the APL value V_APL increases. Therefore, when the display device displays the high luminance image corresponding a high APL value, the adjusted gray level result GR' would be decreased. In this way, the power consumption of the display device is decreased.

In the embodiment, the APL calculator 120 calculates APL values corresponding to different images of different frames. For example, the APL calculator 120 calculates a first APL value corresponding to a first image of a first frame. The APL calculator 120 calculates a second APL value corresponding to a second image of a second frame, and so on.

Figure 2:
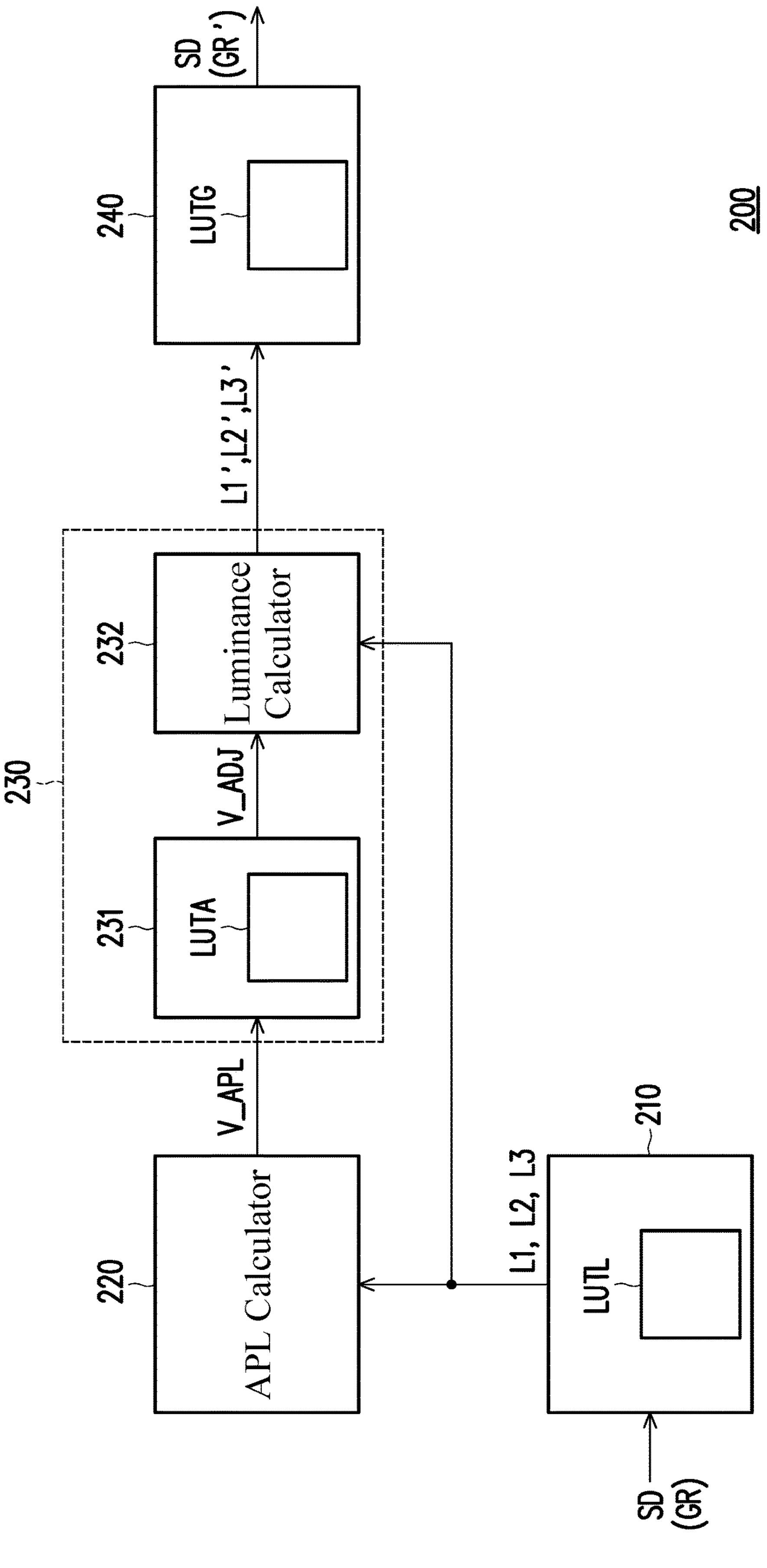
FIG. 2 illustrates a schematic diagram of a luminance control circuit according to an embodiment of the disclosure.

Please refer to FIG. 2, FIG. 2 illustrates a schematic diagram of a luminance control circuit according to an embodiment of the disclosure. In the embodiment, the luminance control circuit 200 includes a first converter 210, an APL calculator 220, a luminance adjusting circuit 230 and a second converter 240. The first converter 210 includes a luminance look-up table LUTL. The luminance look-up table LUTL stores a plurality of luminance corresponding different gray levels. The first converter 210 provides luminance using the luminance look-up table LUTL.

Figure 3:
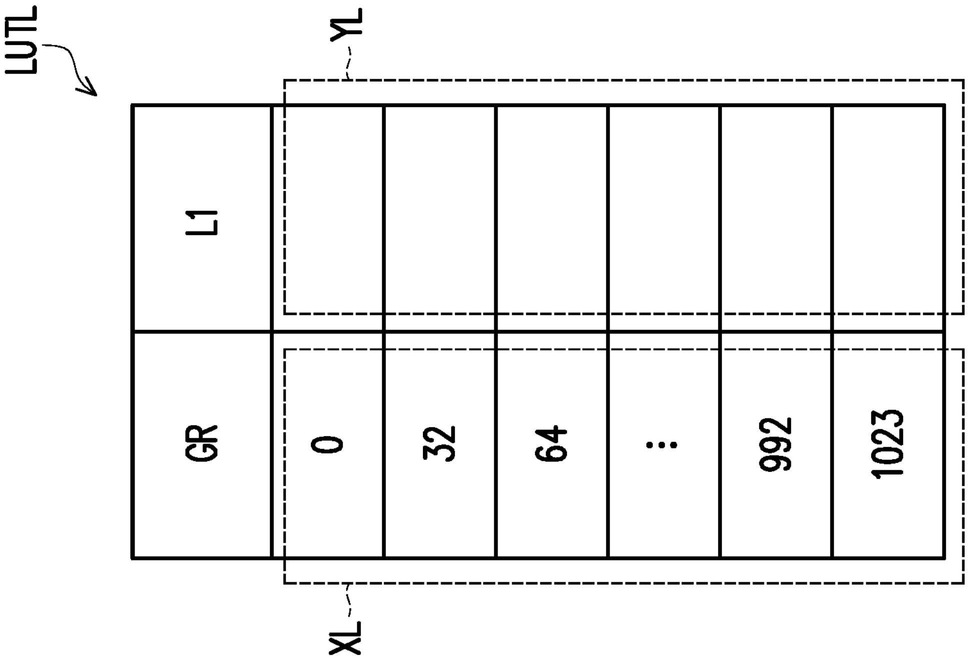
FIG. 3 illustrates a schematic diagram of a luminance look-up table according to an embodiment of the disclosure.

Detailly, please refer to FIG. 2 and FIG. 3, FIG. 3 illustrates a schematic diagram of a luminance look-up table according to an embodiment of the disclosure. In the embodiment, FIG. 3 illustrates the luminance look-up table LUTL corresponding to a first color (for example, red, but the disclosure is not limited thereto). The luminance look-up table LUTL includes regions XL and YL. The region XL stores different gray levels of the first color of the image data SD. The gray levels are "0" to "1023", but the disclosure is not limited thereto. The region YL stores the luminance corresponding the different gray levels in the region XL. For example, when the gray level result GR is "992", the luminance L1 provided by the first converter 210 using the luminance look-up table LUTL is "500". For example, when the gray level result GR is "1000", the first converter 210 provides the luminance L1 by a linear interpolation manner or a non-linear interpolation manner of gamma rule based on the luminance look-up table LUTL.

Similarly, the luminance L2 and L3 may be provided by the luminance look-up table LUTL or other luminance look-up table.

Please refer to FIG. 2, in the embodiment, the APL calculator 220 generates pixel level values PL1 to PLn of pixels according to the luminance L1 to L3 of the pixels and color weight values W1 to W3. The APL calculator 220 averages the pixel level values PL1 to PLn to generate the APL value V_APL. For example, the APL calculator 220 calculates the APL value V_APL based on formula (1) and formula (2).

$$PLi = W1 \times L1i + W2 \times L2i + W2 \times L3i \qquad \text{formula (1)}$$

$$\text{V\_APL} = \frac{\sum_{i=1}^{n} PLi}{N} \qquad \text{formula (2)}$$

Wherein "i" in one of "1" to "n". The color weight value W1 is weight value of the first color (for example, red). The color weight value W2 is weight value of a second color (for example, green). The color weight value W3 is weight value of a third color (for example, blue). "L1*m*" is a luminance of the first color of a "i"th pixel. "L2*m*" is a luminance of the second color of the "i"th pixel. "L3*m*" is a luminance of the third color of the "i"th pixel. Wherein "N" is number of the pixels.

Furthermore, in some embodiments, the APL value V_APL is an integer further generated based on rounding operation, unconditional discarding operation or unconditional carry operation.

In the embodiment, the luminance adjusting circuit 230 includes an adjusting value generator 231 and a luminance calculator 232. The adjusting value generator 231 is coupled to the APL calculator 220. The adjusting value generator 231 generates the adjusting value V_ADJ according to the APL value V_APL.

In the embodiment, the adjusting value generator 231 includes an adjusting value look-up table LUTA. The adjusting value look-up table LUTA store adjusting values corresponding different APL values. The adjusting value generator 231 provides the adjusting value V_ADJ using the adjusting value look-up table LUTA.

The luminance calculator 232 is coupled to the adjusting value generator 231 and the first converter 210. The luminance calculator 232 multiplies the adjusting value V_ADJ and the luminance L1 to L3 to calculate the adjusted luminance L1' to L3'. For example, the luminance calculator 232 multiplies the adjusting value V_ADJ and the luminance L1 to calculate the adjusted luminance L1'. The luminance calculator 232 multiplies the adjusting value V_ADJ and the luminance L2 to calculate the adjusted luminance L2'. The luminance calculator 232 multiplies the adjusting value V_ADJ and the luminance L3 to calculate the adjusted luminance L3'.

Figure 4:
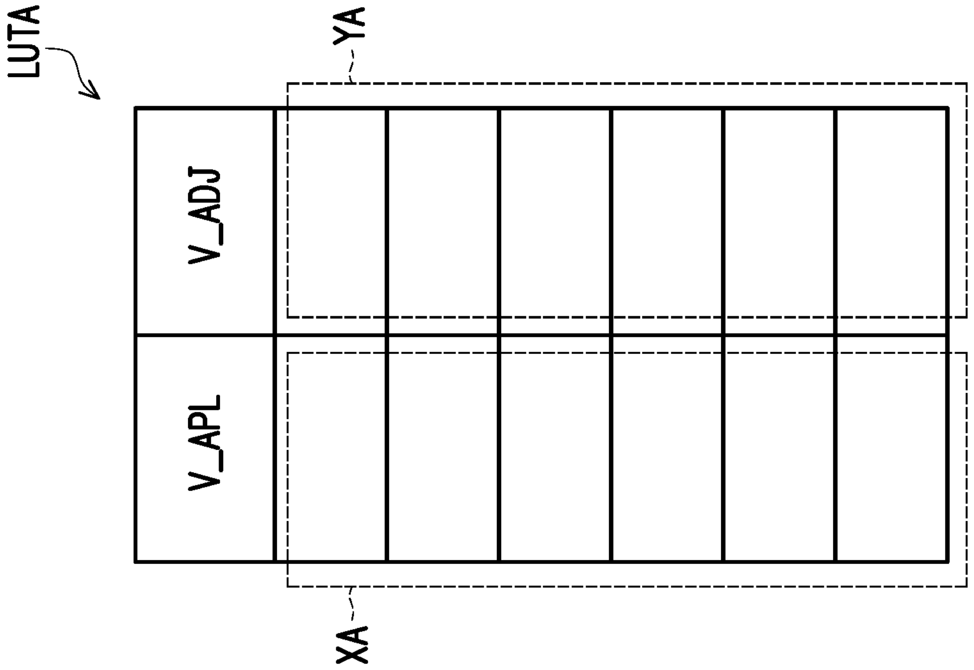
FIG. 4 illustrates a schematic diagram of an adjusting value look-up table according to an embodiment of the disclosure.

Please refer to FIG. 2 and FIG. 4, FIG. 4 illustrates a schematic diagram of an adjusting value look-up table according to an embodiment of the disclosure. The adjusting value look-up table LUTA includes regions XA and YA. The region XA stores different APL values. The region YA stores the adjusting values corresponding the APL values in the region XL. For example, when the APL value V_APL is “64”, the adjusting value V_ADJ is “0.98”. For example, when the APL value V_APL is “1023”, the adjusting value V_ADJ is “0.66”. For example, when the APL value V_APL is “1000”, the first converter 210 provides the adjusting value V_ADJ by a linear interpolation manner or a non-linear interpolation manner of gamma rule based on the adjusting value look-up table LUTA. The adjusting value V_ADJ is negative correlated with the APL value V_APL.

Please refer to FIG. 2 again, in the embodiment, the second converter 240 is coupled to the luminance calculator 232. The second converter 240 includes a gray level look-up table LUTG. The gray level look-up table LUTG stores adjusted gray levels corresponding different adjusted luminance. The second converter 240 provides the adjusted gray level result GR' using the gray level look-up table LUTG. For example, a content of the gray level look-up table LUTG is similar to a content of the luminance look-up table LUTL as shown in FIG. 3.

Figure 5:
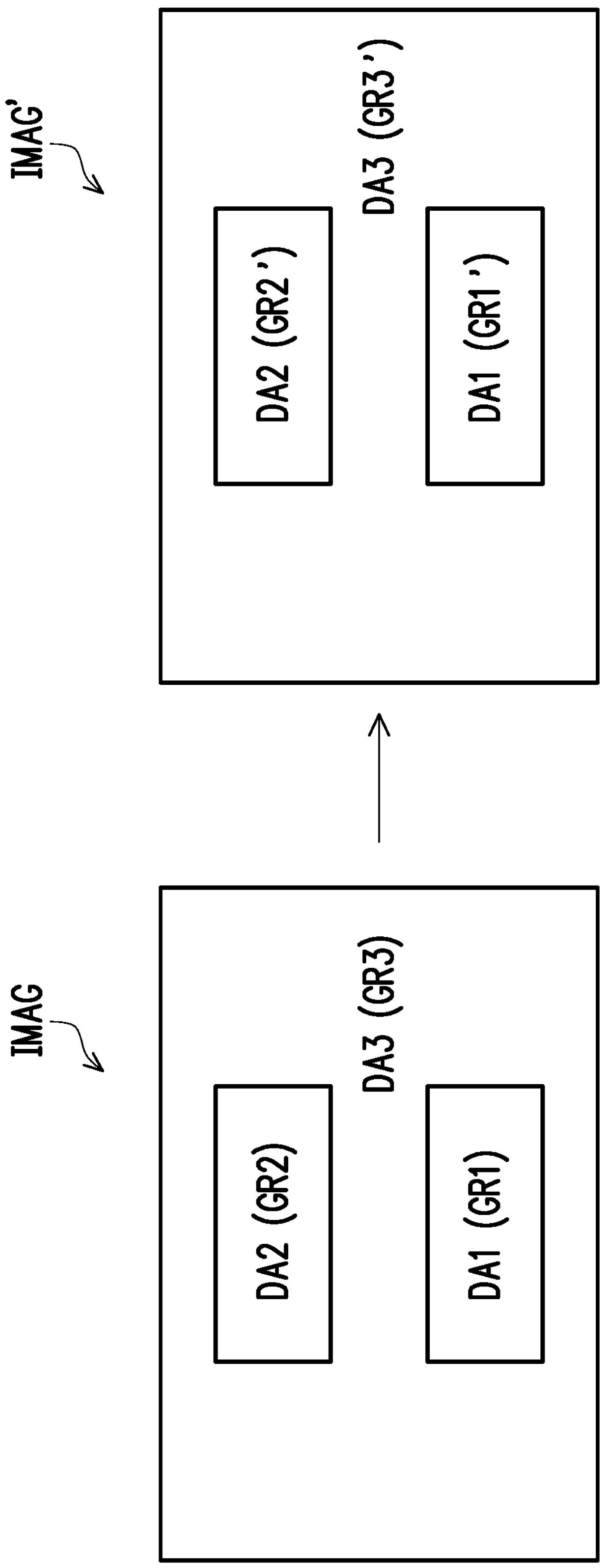
FIG. 5 illustrates an operating schematic diagram according to an embodiment of the disclosure.

Please refer to FIG. 2 and FIG. 5, FIG. 5 illustrates an operating schematic diagram according to an embodiment of the disclosure. FIG. 5 illustrates a displaying image IMAG and an adjusted displaying image IMAG' corresponding to the image data SD. The displaying image IMAG includes image areas DA1, DA2 and DA3. The gray level result GR corresponding to displaying image IMAG includes gray levels GR1 to GR3. The image area DA1 has the gray level GR1. The image area DA2 has the gray level GR2. The image area DA3 has the gray level GR3. For example, the gray level GR1 is “255”. The gray level GR2 is “192”. The gray level GR3 is “0”. Therefore, the first converter 210 converts the gray level GR1 into the luminance L1. The first converter 210 converts the gray level GR2 into the luminance L2. The first converter 210 converts the gray level GR3 into the luminance L3. In the embodiment, each of the luminance L1 to L3 is a luminance of different sub area in the displaying area.

For example, the luminance L1 is “1023”. The luminance L2 is “960”. The luminance L3 is “0”. The APL calculator 220 generates the APL value V_APL which is equal to “31”. Therefore, the adjusting value V_ADJ provided by the adjusting value generator 231 generates is “0.9”. The luminance calculator 232 multiplies the adjusting value V_ADJ and the luminance L1 to calculate the adjusted luminance L1' (that is, the adjusted luminance L1'=0.9×1023=920). The luminance calculator 232 multiplies the adjusting value V_ADJ and the luminance L2 to calculate the adjusted luminance L2' (that is, the adjusted luminance L2'=0.9×960=864). The luminance calculator 232 multiplies the adjusting value V_ADJ and the luminance L3 to calculate the adjusted luminance L3' (that is, the adjusted luminance L3'=0.9×0=0).

The second converter 240 converts the adjusted luminance L1' into an adjusted gray level GR1' of the adjusted gray level result GR'. The adjusted gray level GR1' is “186”. The second converter 240 converts the adjusted luminance L2' into an adjusted gray level GR2' of the adjusted gray level result GR'. The adjusted gray level GR2' is “168”. The second converter 240 converts the adjusted luminance L3' into an adjusted gray level GR3' of the adjusted gray level result GR'. The adjusted gray level GR3' is “0”. Therefore, the displaying image IMAG is changed to be the adjusted displaying image IMAG'. In the adjusted displaying image IMAG', the adjusted gray level GR1' of the image area DA1 is “186”. The adjusted gray level GR2' of the image area DA2 is “168”. The adjusted gray level GR3' of the image area DA3 is “0”.

Figure 6:
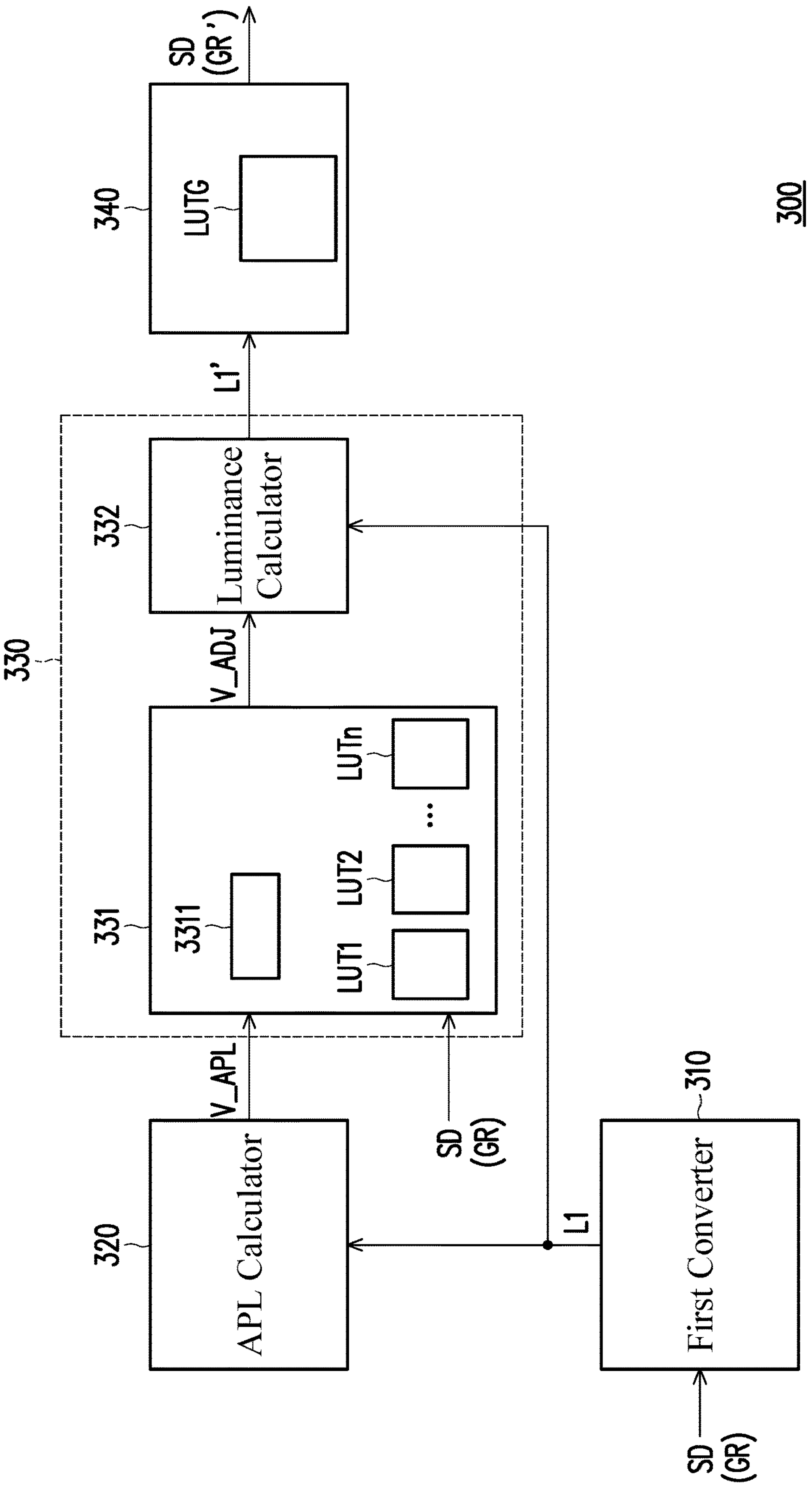
FIG. 6 illustrates a schematic diagram of a luminance control circuit according to an embodiment of the disclosure.

Please refer to FIG. 6, FIG. 6 illustrates a schematic diagram of a luminance control circuit according to an embodiment of the disclosure. In the embodiment, the luminance control circuit 300 includes a first converter 310, an APL calculator 320, a luminance adjusting circuit 330 and a second converter 340. The first converter 310 converts a gray level result GR of the image data SD into the luminance L1. The APL calculator 320 generates an APL value V_APL according to the luminance L1. The luminance adjusting circuit 330 generates adjusting value V_ADJ according to the APL value V_APL and adjusts the at least one luminance L1 to be adjusted luminance L1' using the adjusting value V_ADJ. The second converter 340 converts the adjusted luminance L1' into an adjusted gray level result GR'. Operations of the first converter 310, the APL calculator 320 and the second converter 340 have been clearly explained in the embodiments of FIG. 1 to FIG. 5, so it will not be repeated here.

In the embodiment, the luminance adjusting circuit 330 includes an adjusting value generator 331 and a luminance calculator 332. The adjusting value generator 331 includes reference look-up tables LUT1 to LUTn and a remapping circuit 3311. The remapping circuit 3311 selects at least one selected reference look-up table from the reference look-up tables LUT1 to LUTn according to the APL value V_APL. Each of the at least one selected reference look-up table provides one of the at least one adjusting value according to the gray level result GR. The luminance calculator 332 is coupled to the adjusting value generator 331. The luminance calculator 332 calculates the adjusted luminance L1' according to the at least one adjusting value.

Figure 7:
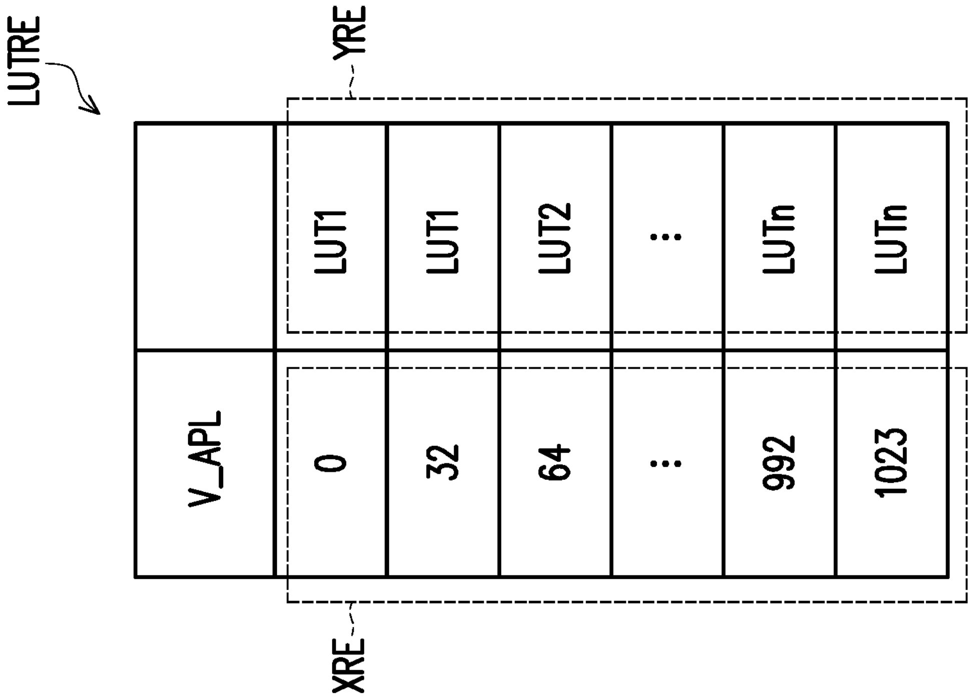
FIG. 7 illustrates a schematic diagram of a remapping look-up table according to an embodiment of the disclosure.
Figure 8:
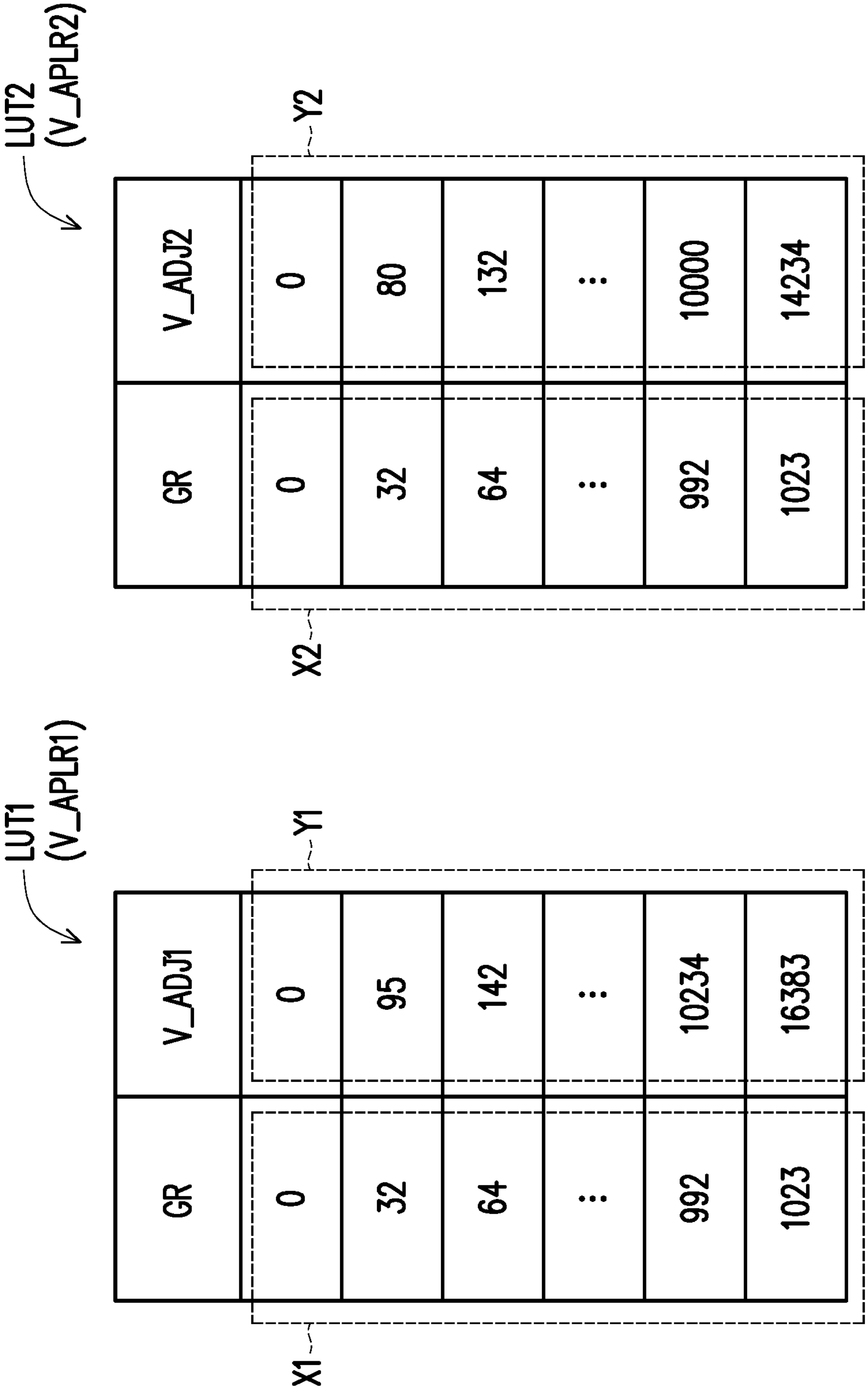
FIG. 8 illustrates a schematic diagram of reference look-up tables according to an embodiment of the disclosure.

Please refer to FIG. 6, FIG. 7 and FIG. 8, FIG. 7 illustrates a schematic diagram of a remapping look-up table according to an embodiment of the disclosure. FIG. 8 illustrates a schematic diagram of reference look-up tables according to an embodiment of the disclosure. In the embodiment, the remapping circuit 3311 includes a remapping look-up table LUTRE. The remapping look-up table LUTRE includes regions XRE and YRE. The region XRE stores different APL values. For example, the APL values are “0” to “1023”, but the disclosure is not limited thereto. The region YRE stores the reference look-up table corresponding the APL values in the region XRE. FIG. 8 illustrates the reference look-up tables LUT1 and LUT2. The reference look-up table LUT1 includes regions X1 and Y1. The region X1 stores different gray level results. The region Y1 stores adjusting value V_ADJ1 corresponding the different gray level results in the region X1. The reference look-up table LUT2 includes regions X2 and Y2. The region X2 stores different gray level results. The region Y2 stores adjusting value V_ADJ2 corresponding the different gray level results in the region X2. It should be noted, the adjusting values V_ADJ1 is a first reference luminance. The adjusting values V_ADJ2 is a second reference luminance.

In the embodiment, the reference look-up tables LUT1 to LUTn is used to different ranges of the APL value V_APL. For example, the reference look-up table LUT1 is used to the APL value V_APL lower than or equal to "32". The reference look-up table LUT2 is used to the APL value V_APL higher than "32" and lower than or equal to "64", and so on. In the reference look-up table LUT1, the adjusting value V_ADJ1 has a first rising trend based on the APL value V_APL. In the reference look-up table LUT2, the adjusting value V_ADJ2 has a second rising trend based on the APL value V_APL. The second rising trend is lower than the first rising trend. Similarly, In the reference look-up table LUT3 (not shown), an adjusting value stored in the reference look-up table LUT3 has a third rising trend based on the APL value V_APL. The third rising trend is lower than the second rising trend. Based on above, if the APL value V_APL is higher, the remapping circuit 3311 selects the selected reference look-up table corresponding to lower rising trend.

For example, when the APL value V_APL is "48" and the gray level result GR is "1000", the remapping circuit 3311 selects the reference look-up table LUT1 corresponding to a reference APL value V_APLR1 and the reference look-up table LUT2 corresponding to a reference APL value V_APLR2. The reference APL value V_APLR1 is "32" as shown in the remapping look-up table LUTRE. The reference APL value V_APLR2 is "64" as shown in the remapping look-up table LUTRE. The reference look-up table LUT1 provides the adjusting value V_ADJ1 based on the interpolation manner. The adjusting value V_ADJ1 is "11771". That is, the adjusting value $V\_ADJ1=(16383-10234)\times(1000-992)/32+10234=11771$. The reference look-up table LUT2 provides the adjusting value V_ADJ2 based on the interpolation manner. The adjusting value V_ADJ2 is "11058". That is, the adjusting value $V\_ADJ2=(14234-10000)\times(1000-992)/32+10000=11058$.

The luminance calculator 332 receives the adjusting values V_ADJ1 and V_ADJ2. The luminance calculator 332 calculates the adjusted luminance L1' according to the reference APL values (that is "64" and "32"), the APL value V_APL (that is "48"), the adjusting values V_ADJ1 and V_ADJ2. The luminance calculator 332 calculates that the adjusted luminance L1' is "11414" based on the interpolation manner. That is, the adjusted luminance $L1'=(11771-11058)\times(48-32)/(64-32)+11058=11414$.

Next, the second converter 340 converts the adjusted luminance L1' into the adjusted gray level result GR' based on the interpolation manner using the gray level look-up table LUTG. Therefore, the adjusted gray level result GR' is "998".

Please refer to FIG. 1 again, in some embodiments, the luminance adjusting circuit 130 may include the luminance adjusting operation as descripted in FIG. 2 to FIG. 5 and the luminance adjusting operation as descripted in FIG. 6 and FIG. 8. A user can select one of the two luminance adjusting operations to control the luminance adjusting circuit 130.

Figure 9:
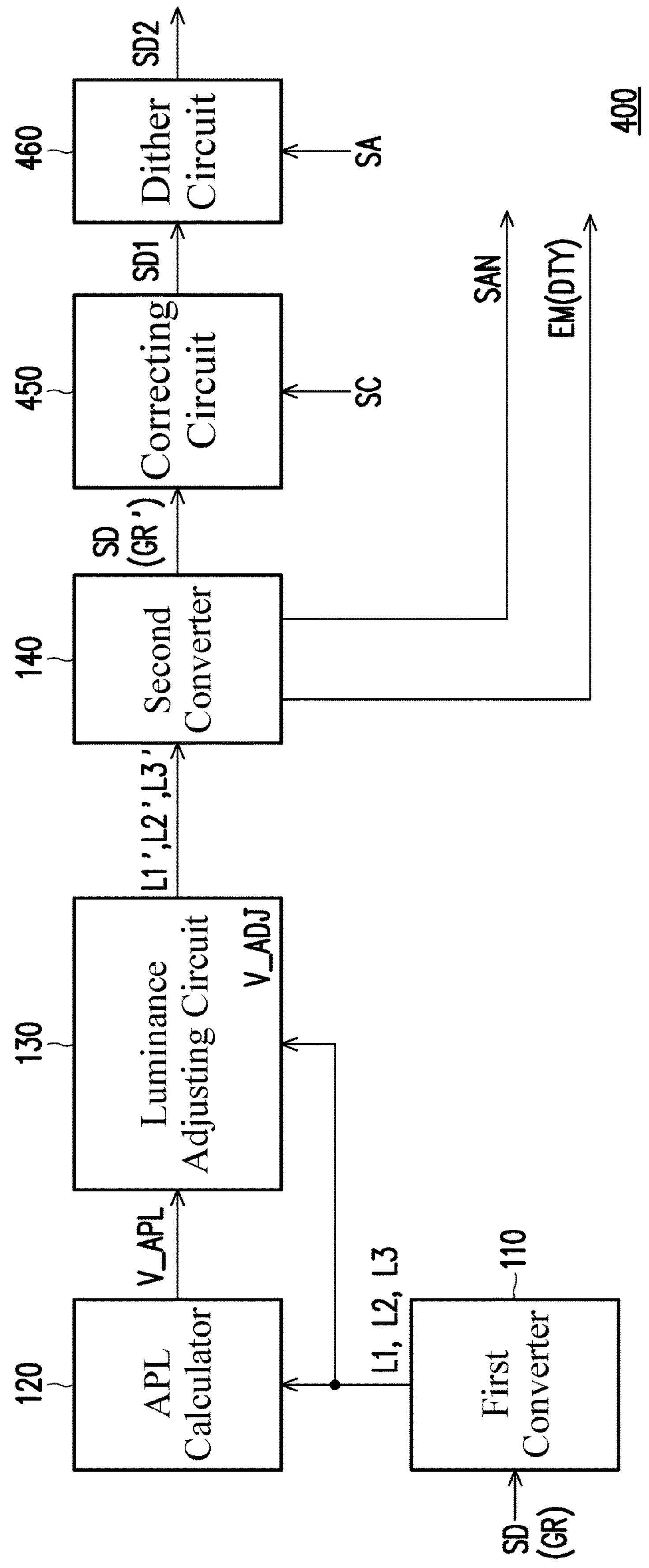
FIG. 9 illustrates a schematic diagram of a luminance control circuit according to an embodiment of the disclosure.

Please refer to FIG. 9, FIG. 9 illustrates a schematic diagram of a luminance control circuit according to an embodiment of the disclosure. In the embodiment, the luminance control circuit 400 includes the first converter 110, the APL calculator 120, the luminance adjusting circuit 130, the second converter 140, correcting circuit 450 and a dither circuit 460. Operations of the luminance control circuit 400 includes the first converter 110, the APL calculator 120, the luminance adjusting circuit 130, the second converter 140 have been clearly explained in the embodiments of FIG. 1 to FIG. 8, so it will not be repeated here.

In the embodiment, the correcting circuit 450 is coupled to the second converter 140. the correcting circuit 450 corrects a color temperature of the image data SD from the second converter 140 in response to a correcting command SC. The dither circuit 460 is coupled to the correcting circuit 450. The dither circuit 460 adjust a resolution of the image data SD by a dither operation in response to an adjusting command SA. In the embodiment, the correcting circuit 450 corrects the color temperature of the image data SD to generate corrected data signal SD1. A resolution of the corrected data signal SD1 is equal to the resolution of the image data SD. The dither circuit 460 receives the corrected data signal SD1 and adjusts the resolution to generate adjusted data signal SD2.

Besides, the second converter 140 converts at least one of the adjusted luminance L1', L2' and L3' into an analog signal SAN. For example, the analog signal SAN is a gamma voltage signal. A voltage value of the analog signal SAN is decided by at least one of the adjusted luminance L1', L2' and L3'.

Besides, the second converter 140 converts at least one of the adjusted luminance into an emission driving signal EM having a duty cycle DTY. For example, the analog signal SAN is a gamma voltage signal. The duty cycle DTY is decided by at least one of the adjusted luminance L1', L2' and L3'.

Figure 10:
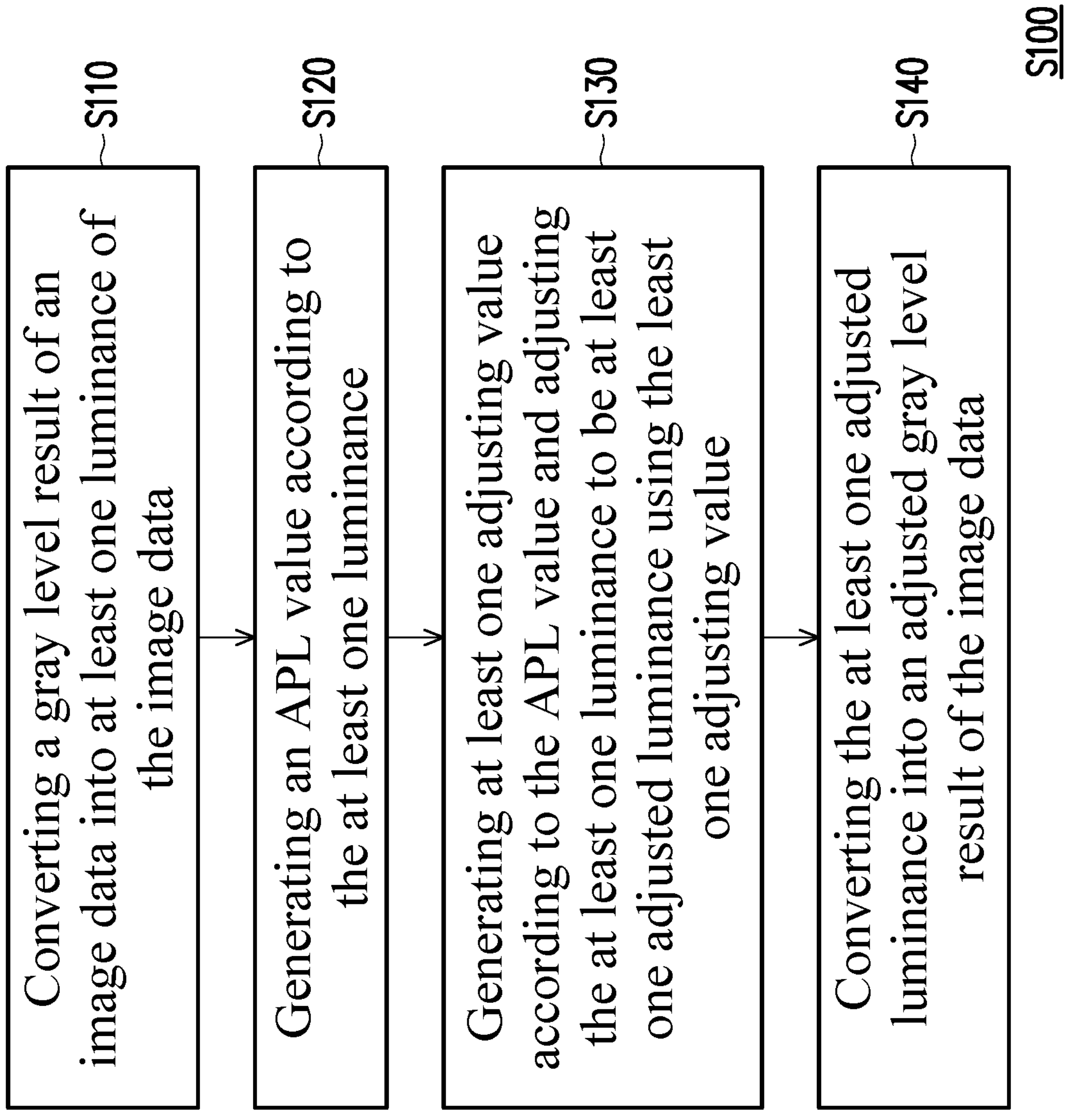
FIG. 10 illustrates a flow diagram of a luminance control method according to an embodiment of the disclosure.

Please refer to FIG. 1 and FIG. 10, FIG. 10 illustrates a flow diagram of a luminance control method according to an embodiment of the disclosure. In the embodiment, the luminance control method S100 could be used for the luminance control circuit 100. The luminance control method S100 includes steps S110 to S140. In the step S110, the first converter 110 converts a gray level result GR of the image data SD into luminance L1 to L3. In the step S120, the APL calculator 120 generates an APL value V_APL according to the luminance L1 to L3. In the step S130, the luminance adjusting circuit 130 generates adjusting value V_ADJ according to the APL value V_APL and adjusts the at least one luminance L1 to L3 to be adjusted luminance L1' to L3' using the adjusting value V_ADJ. The second converter 140 converts the adjusted luminance L1' to L3' into an adjusted gray level result GR'. In the embodiment, the adjusted gray level result GR' is negative correlated with the APL value V_APL. Detailly operations of the steps S110 to S140 have been clearly explained in the embodiments of FIG. 1, so it will not be repeated here.

In view of the foregoing, the adjusted gray level result is negative correlated with the APL value. The adjusted gray level result would be decreased as the APL value increases. Therefore, when the display device displays the high luminance image corresponding a high APL value, the adjusted gray level result would be decreased. In this way, the power consumption of the display device could be decreased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A luminance control circuit, comprising:

a first converter, configured to convert a gray level result of an image data into at least one luminance of the image data;

an average pixel level (APL) calculator, coupled to the first converter, and configured to generate an APL value according to the at least one luminance;

a luminance adjusting circuit, coupled to the APL calculator and the first converter, and configured to generate at least one adjusting value according to the APL value and adjust the at least one luminance of the image data to be at least one adjusted luminance using the least one adjusting value; and a second converter, coupled to the first converter, and configured to convert the at least one adjusted luminance into an adjusted gray level result of the image data, wherein the adjusted gray level result is negative correlated with the APL value.

2. The luminance control circuit of claim 1, wherein the first converter comprises:

a luminance look-up table, configured to store a plurality of luminance corresponding different gray levels.

3. The luminance control circuit of claim 1, wherein the APL calculator generates a plurality of pixel level values of a plurality of pixels according to the at least one luminance of the plurality of pixels and at least one color weight value, and averages the plurality of pixel level values to generate the APL value.

4. The luminance control circuit of claim 1, wherein the luminance adjusting circuit comprises:

an adjusting value generator, coupled to the APL calculator, and configured to generate the at least one adjusting value according to the APL value; and a luminance calculator, coupled to the adjusting value generator and the first converter, and configured to multiply the least one adjusting value and the at least one luminance to calculate the at least one adjusted luminance.

5. The luminance control circuit of claim 4, wherein the adjusting value generator comprises:

an adjusting value look-up table, configured to store a plurality of adjusting values corresponding different APL values.

6. The luminance control circuit of claim 1, wherein the second converter comprises:

a gray level look-up table, configured to store a plurality of adjusted gray levels corresponding different adjusted luminance.

7. The luminance control circuit of claim 1, wherein the luminance adjusting circuit comprises:

an adjusting value generator, comprising:

a plurality of reference look-up tables; and a remapping circuit, wherein the remapping circuit selects at least one selected reference look-up table from the plurality of reference look-up tables according to the APL value, wherein each of the at least one selected reference look-up table provides one of the at least one adjusting value according to the gray level result.

8. The luminance control circuit of claim 7, wherein:

the at least one selected reference look-up table comprises a first selected reference look-up table corresponding a first reference APL value and a second selected reference look-up table corresponding a second reference APL value, the at least one adjusting value comprises a first adjusting value and a second adjusting value, the first adjusting value is a first reference luminance, and the second adjusting value is a second reference luminance.

9. The luminance control circuit of claim 8, wherein the luminance adjusting circuit further comprises:

a luminance calculator, coupled to the adjusting value generator, and configured to calculate the at least one adjusted luminance according to the first reference APL value, the second reference APL value, the APL value, the first adjusting value and the second adjusting value.

10. The luminance control circuit of claim 1, wherein the second converter converts the at least one adjusted luminance into an analog signal.

11. The luminance control circuit of claim 1, wherein the second converter converts the at least one adjusted luminance into an emission driving signal having a duty cycle.

12. The luminance control circuit of claim 1, further comprising:

a correcting circuit, coupled to the second converter, and configured to correct a color temperature of the image data having the adjusted gray level result in response to a correcting command.

13. The luminance control circuit of claim 12, further comprising:

a dither circuit, coupled to the correcting circuit, and configured to adjust a resolution of the image data by a dither operation in response to an adjusting command.

14. A luminance control method, comprising:

converting a gray level result of an image data into at least one luminance of the image data;

generating an average pixel level (APL) value according to the at least one luminance;

generating at least one adjusting value according to an APL value and adjusting the at least one luminance to be at least one adjusted luminance using the least one adjusting value; and converting the at least one adjusted luminance into an adjusted gray level result of the image data, wherein the adjusted gray level result is negative correlated with the APL value.

15. The luminance control method of claim 14, wherein generating the APL value according to the at least one luminance comprises:

generates a plurality of pixel level values of a plurality of pixels according to the at least one luminance and at least one color weight value; and averaging the plurality of pixel level values to generate the APL value.

16. The luminance control method of claim 14, wherein adjusting the at least one luminance to be the at least one adjusted luminance using the least one adjusting value comprises:

multiply the least one adjusting value and the at least one luminance to calculate the at least one adjusted luminance.

17. The luminance control method of claim 14, wherein generating the at least one adjusting value according to the APL value comprises:

providing a plurality of reference look-up tables; and selecting at least one selected reference look-up table from the plurality of reference look-up tables according to the APL value, wherein:

the at least one selected reference look-up table comprises a first selected reference look-up table corresponding a first reference APL value and a second selected reference look-up table corresponding a second reference APL value, the at least one adjusting value comprises a first adjusting value and a second adjusting value, the first adjusting value is a first reference luminance, and the second adjusting value is a second reference luminance.

18. The luminance control method of claim 17, wherein adjusting the at least one luminance to be the at least one adjusted luminance using the least one adjusting value comprises:

calculating the at least one adjusted luminance according to the first reference APL value, the second reference APL value, the APL value, the first adjusting value and the second adjusting value.

19. The luminance control method of claim 14, further comprising:

converting the at least one adjusted luminance into an analog signal.

20. The luminance control method of claim 14, further comprising:

converting the at least one adjusted luminance into an emission driving signal having a duty cycle.

* * * * *